Jan. 31, 1933.　　　A. C. HAYDEN　　　1,895,794
MOTION PICTURE PROJECTOR APPARATUS
Filed Jan. 15, 1930　　　3 Sheets-Sheet 1
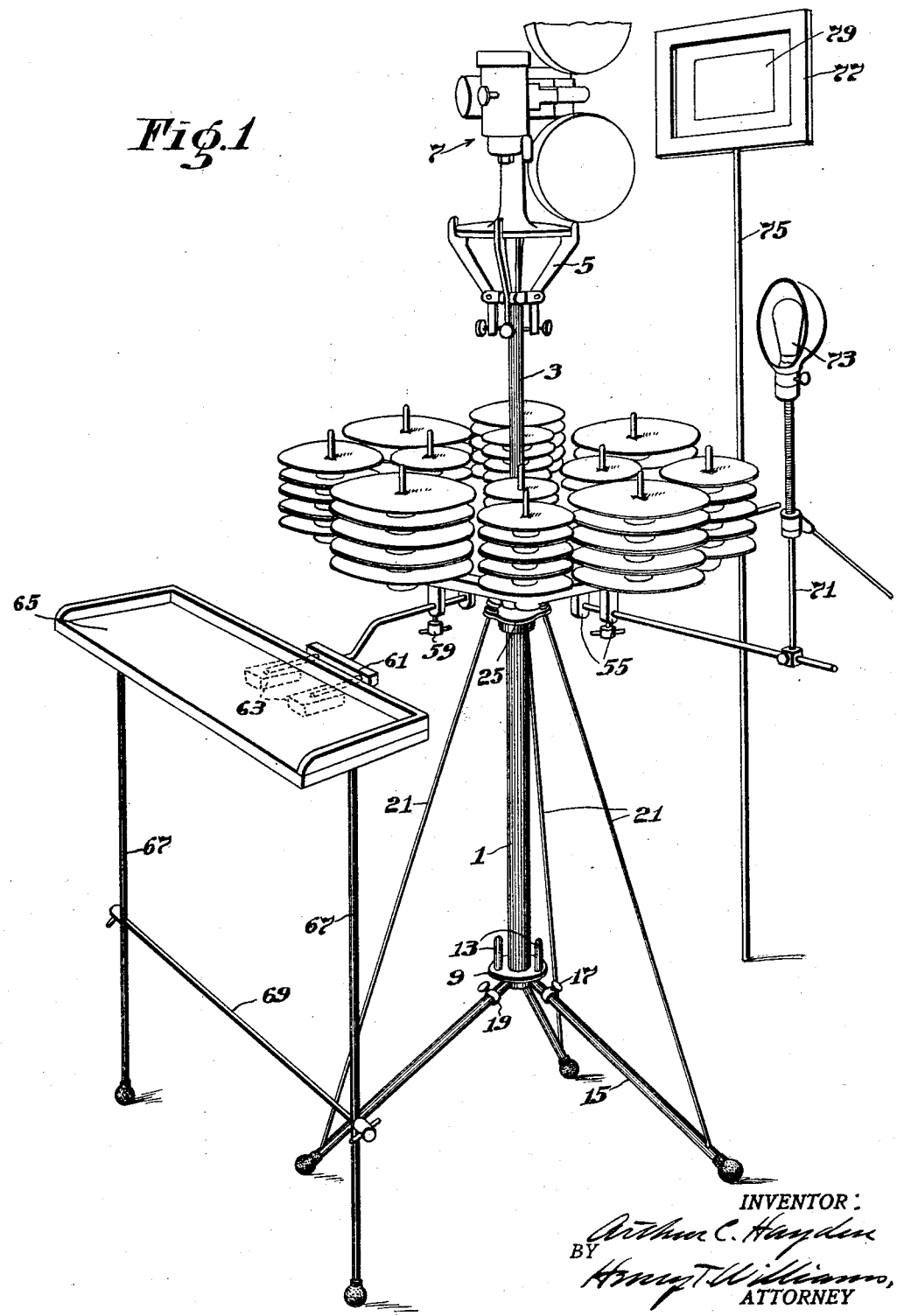

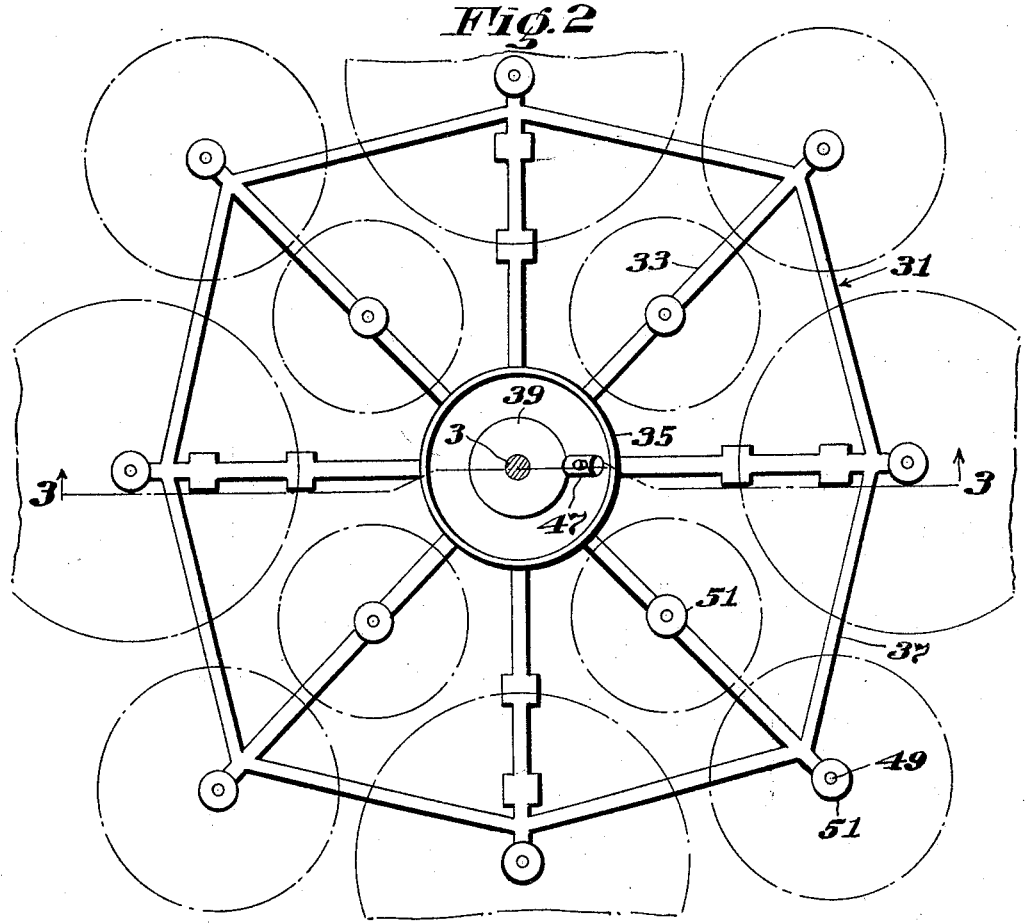
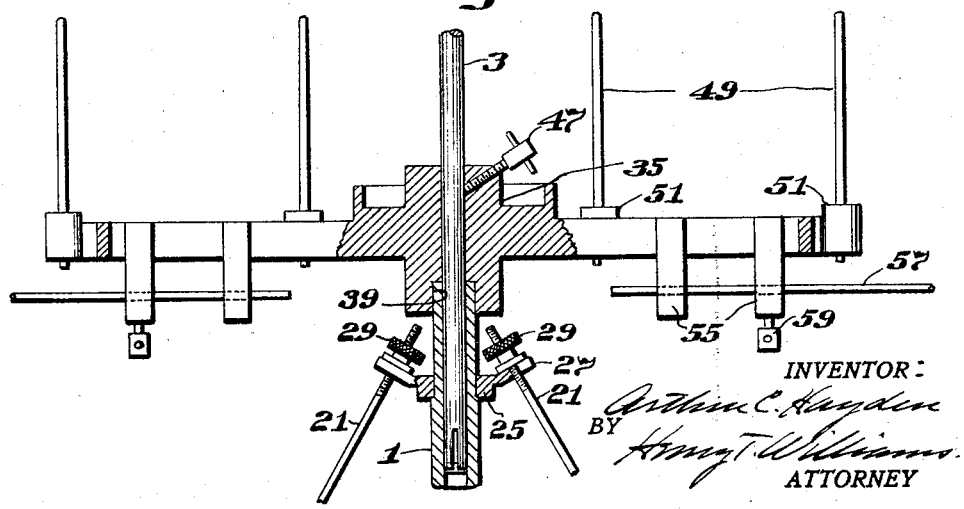

Jan. 31, 1933.  A. C. HAYDEN  1,895,794
MOTION PICTURE PROJECTOR APPARATUS
Filed Jan. 15, 1930   3 Sheets-Sheet 3
Fig.4
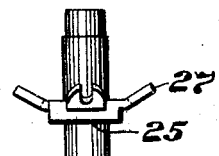
Fig.6
Fig.7
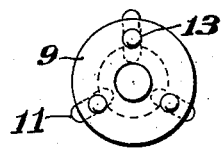
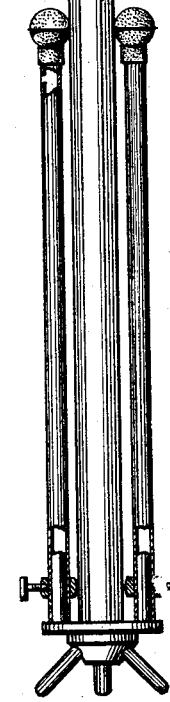
Fig.5
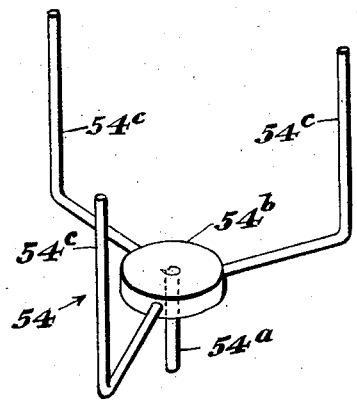
Fig.8
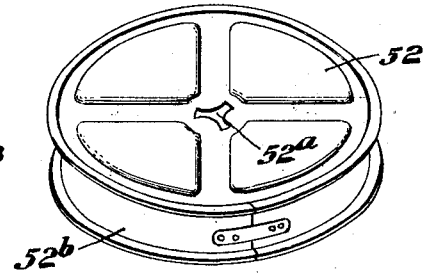
Fig.9
INVENTOR:
Arthur C. Hayden
BY
Henry T. Williams,
ATTORNEY Patented Jan. 31, 1933

1,895,794

UNITED STATES PATENT OFFICE

ARTHUR C. HAYDEN, OF BROCKTON, MASSACHUSETTS

MOTION PICTURE PROJECTOR APPARATUS

Application filed January 15, 1930. Serial No. 420,984.

The invention to be hereinafter described relates to apparatus for use in connection with motion picture projectors.

One of the purposes of the invention is to provide a stand with a rotatable table having spindles distributed thereon, each adapted to receive several motion picture film reels. In the present instance of the invention the table has a capacity for receiving sixty reels, and the arrangement is such that they occupy a small space and are so located that any reel may be quickly and easily selected for use on the projector.

Another purpose of the invention is to provide a table with means for connection with various attachments for use in connection with the projector.

With the aforesaid and other purposes in view, the character of the invention may be best understood by reference to the following description of one good form thereof shown in the accompanying drawings, wherein:

Fig. 1 is a perspective view of apparatus embodying the invention for use in connection with motion picture projectors;

Fig. 2 is a plan of the reel supporting table;

Fig. 3 is a vertical section taken on line 3—3 of Fig. 2;

Fig. 4 is a plan of the collar having forks for receiving the upper ends of the tie rods;

Fig. 5 is a side view of the lower post and the legs in collapsed relation;

Fig. 6 is a view of one of the tie rods;

Fig. 7 is a plan of the collar at the lower end of the lower post and having the studs for receiving the legs;

Fig. 8 is a perspective view of the holder for reel boxes which do not have central holes to receive the spindles; and Fig. 9 is a perspective view of the reel having the rim cover on the peripheries of the side plates.

Referring to the drawings, the apparatus shown therein as one good embodiment of the invention, includes a stand comprising a lower tubular post 1 and an upper post 3 telescoping therewith and having arms 5 at the upper end thereof for supporting the motion picture projector 7.

At the bottom of the lower post 1 and forming a part thereof is a collar 9 (Figs. 1 and 7) having a set of downwardly inclined studs 11 and a set of vertical upstanding studs 13. To support the stand three tubular legs 15 are fitted on the studs 11 and are prevented from escaping therefrom by set screws 17 threaded into holes in rings 19 and entered through registering holes in the legs, so that said set screws may bear against the studs 11. It is desirable to provide threaded holes in the rings instead of in the legs, since in case a threaded hole in a ring should become mutilated, another ring may be easily substituted therefor, without the necessity of substituting a whole new leg.

To contribute to the stiffness of the construction, tie rods 21 may be provided having hooks or bent ends 23 adapted to be inserted in holes in the legs near the lower ends thereof. Mounted on the lower post is a collar 25 having forks 27 for receiving the upper ends of the tie rods. Threaded on the latter are nuts 29 which may be set up against the upper faces of the forks 27. In applying the tie rods to the legs, they are lowered and their hooks are inserted in the holes in the legs, and then they are swung to their upright position causing the hooks to interlock with the legs.

When it is desired to collapse the stand to bring parts thereof into compact form for convenience in transportation, the tie rods are removed, and the legs are detached from the studs 11 and applied to the studs 13, as will be noted in Fig. 5. They are inverted and stand on the collar 9 along and parallel to the post where they may be secured by the set screws 17 engaging studs 13.

An important feature of the invention is the provision of a table 31 (Figs. 1, 2 and 3), in the present instance of skeleton form, and comprising radial members 33 projecting horizontally outward from a hub 35, said radial members being connected adjacent their outer ends by members 37 which collectively form the perimeter of the table. The hub and the members may be conveniently in the form of a single casting. The hub has a counter-bore 39 (Fig. 3) in the lower end thereof adapted to receive the upper end of the lower post. A set screw 47 is threaded into a hole in the hub 35 and adapted to engage the upper post and secure the table in different positions of rotative adjustment. This table is adapted to support a multiplicity of film reels, and to accomplish this, spindles 49 are provided having reduced ends set into holes in bosses 51, some being on the outer ends of the radial members 33, and others being on said members intermediate the ends thereof. In the present instance, twelve spindles are provided, and four reels are on each spindle, although each can accommodate five reels, making a total of sixty reels. The spindles are radially and circumferentially distributed on the table, the arrangement being such that many reels are accommodated in a minimum overall area. Reels of different diameters or all of the same diameter may be mounted on the table. In the present instance, some have a capacity for 400 feet of film, others 200 feet of film, and still others 100 feet of film.

In my copending application Serial No. 420,983, filed Jan. 15, 1930, is disclosed an improved humidor reel such as is shown in Fig. 9, having solid side plates 52 with central registering holes 52a, said reel being provided with a detachable rim cover 52b. Within and connected to the cover are felt strips (not shown) adapted to be moistened to prevent the film on the reel from becoming brittle. The necessity for the metal box heretofore used for receiving the reel is eliminated. This humidor reel may be readily mounted on the table spindles. However, in order that the table may support the metal boxes formerly used, a holder 54 (Fig. 8) may be provided having a spindle 54a, on which is a base 54b to which arms 54c are secured. The boxes may be readily placed within these arms.

On release of the set screw 47, the table may be given rotative movement to bring any of the reels to the station of the projector operator. The reels are marked with the subjects of their films, so that the operator may easily select the reel wanted.

It is desirable that various attachments may be used in connection with the reel table. To accomplish this pairs of lugs 55 are provided on the radial members 33 at the under sides thereof, and have registering holes for receiving rods 57 which may be confined against longitudinal movement by set screws 59. One of these rods may have a fork 61 at the outer end thereof, the tines of which are entered into holes of blocks 63 on the under side of a table 65 standing on a pair of legs 67 to which a tie rod 69 is detachably connected. Another of these rods may carry the stand 71 (Fig. 1) of an electric lamp 73 which may be adjusted to throw its light in any direction for the convenience of the operator. Another rod may be used to carry reels which have been used on the projector and are to be set apart, so that later their films may be rewound on other reels. Still another of the rods 57 may be used to hold upright a post 75 carrying a frame 77 containing a glass screen 79 which is convenient for use in projecting small pictures. All of these attachments may be quickly and easily connected to the table and disconnected therefrom.

Parts of the stand may be quickly and easily separated when it is desired to arrange them in compact form to facilitate transportation. To accomplish this, the upper post 3 is removed from the lower post, the table is lifted off from the sleeve 41, and the spindles are lifted from the table. The nuts 29 on the tie rods are unscrewed sufficiently to permit said rods to be swung outward and downward, allowing their hooks 23 to be removed from the holes in the legs. Then the set screws 17 are released and the legs are slipped from the studs 11 and applied to the upstanding studs 13 where they stand along the lower post, as shown in Fig. 5. When the parts have been separated as described, they may be placed in a handbag or other container used to carry the apparatus from place-to-place.

The apparatus described materially contributes to the convenience and ease in projecting motion pictures. The film reels are supported on the same stand as the projector, adjacent thereto. They may be easily and quickly selected, taken from the table and returned thereto.

It will be understood that the invention is not limited to the specific embodiment shown, and that various deviations may be made therefrom without departing from the spirit and scope of the appended claims.

What is claimed is:

1. The combination of a post having provision for supporting a motion picture projector, a collar on the lower end of the post, sets of studs projecting up and down from the collar, and legs having tubular ends for application to the lower set of studs to support the post and adapted for application to the upper set of studs to extend along the post when the parts are to be in collapsed relation.

2. The combination of a post having provision for supporting a motion picture projector, a collar on the lower end of the post, studs projecting down from the collar, tubular legs on the studs, rings embracing the legs and having threaded holes, said legs having smooth holes for registration with the ring holes, and set screws threaded in the ring holes, projecting through the leg holes and adapted to bear against the studs.

3. The combination of a post having provision for supporting a motion picture projector, means providing studs projecting down from the lower end of the post, legs on the studs having holes adjacent the lower ends thereof, a collar on the post having notches therein, tie rods having lower ends anchored in the leg holes and upper ends in the notches, and nuts on the tie rods for securing them in the notches.

4. The combination of a post having provision for supporting a motion picture projector, means providing studs projecting down from the lower end of the post, legs on the studs having holes adjacent the lower ends thereof, a collar on the post having notches therein, tie rods having bent ends for insertion in the leg holes, and upper ends for insertion in the notches, and nuts for securing the tie rods in the notches.

5. A tripod comprising the combination of a post, mounting means secured to the lower end of the post, sets of studs projecting upwardly and downwardly from said mounting means, and detachable legs engageable with the downwardly-extending studs for supporting the post and engageable with the upwardly-extending studs for carrying the legs in collapsed relation adjacent to the post.

6. A tripod comprising the combination of a post, mounting means secured to the lower end of the post, sets of studs projecting upwardly and downwardly from said mounting means, detachable legs engageable with the downwardly-extending studs for supporting the post and engageable with the upwardly-extending studs for carrying the legs in collapsed relation adjacent to the post, and detachable tie rods for connecting the top of the post with the lower ends of the legs when the legs are in their post-supporting position.

7. A tripod comprising the combination of a post, means having a set of upwardly-extending leg attaching means and another set of downwardly-extending leg attaching means secured to the lower end of the post, and cooperating legs detachable from either set of leg attaching means, the legs, when engaged with the upwardly-extending set of leg attaching means, being in collapsed relation adjacent to and extending upwardly along the post and, when engaged with the downwardly-extending set of leg attaching means, extending downwardly in diverging relation to support the post.

ARTHUR C. HAYDEN.